United States Patent [19]

Ward

[11] Patent Number: 4,724,484
[45] Date of Patent: Feb. 9, 1988

[54] SYSTEM FOR TESTING VIDEO EQUIPMENT

[76] Inventor: Richard J. Ward, c/o Manhattan Electronics, Inc., 17 West 45 St., New York, N.Y. 10036-7469

[21] Appl. No.: 896,227

[22] Filed: Aug. 14, 1986

[51] Int. Cl.⁴ ..................... H04N 17/04; H04N 17/06
[52] U.S. Cl. ...................................... 358/139; 360/27
[58] Field of Search ........................ 358/139, 10, 185; 360/27, 71, 69; 369/48, 49, 47

[56] References Cited

U.S. PATENT DOCUMENTS

| | | | |
|---|---|---|---|
| 4,169,219 | 9/1979 | Beard | 369/48 |
| 4,400,742 | 8/1983 | Yamamitsu et al. | 360/27 X |
| 4,542,424 | 9/1985 | Ishihara | 369/47 X |
| 4,583,134 | 4/1986 | Nakamichi | 360/27 X |
| 4,620,239 | 10/1986 | Fujii | 360/27 X |

FOREIGN PATENT DOCUMENTS

| | | | |
|---|---|---|---|
| 0105642 | 4/1984 | European Pat. Off. | 358/139 |
| 2036600 | 2/1971 | Fed. Rep. of Germany | 358/139 |
| 0047384 | 3/1983 | Japan | 358/139 |

OTHER PUBLICATIONS

"The SMPTE Service of Test Films and Slides for Motion Pictures and Television", *Journal of the Society of Motion Picture and Television Engineers*, Aug. '74, vol. 83, #8; by Weinshenk-Tabernero; pp. 658-661.
"The Complete Handbook of Video Cassette Recorders", Kybett, #1211, pp. 265-266, ©1981.
"Servicing Home Video Cassette Recorders", Hobbs, ©1982, pp. 108-119, 167.

*Primary Examiner*—Howard W. Britton
*Assistant Examiner*—Victor R. Kostak
*Attorney, Agent, or Firm*—Natter & Natter

[57] ABSTRACT

A system for testing video equipment includes a video cassette tape cassette which carries prerecorded test signals and patterns such as NTSC standard color bar test patterns, dot patterns, convergence patterns and the like. Playback of the video tape enables one to determine if a video player, recorder, television receiver or monitor is in need of adjustment and permits adjustments without complex test equipment. The test signals are recorded in segments at different speeds to test speed playback functions of the player or recorder and may include a visual countdown for synchronization of subsequent recording. To produce the video tape cassettes with the prerecorded test signals and patterns, a test pattern generator is utilized to provide a signal which is fed to a video recording head. The video recording head records the signals and patterns on a leader portion of each tape prior to loading into a cassette.

14 Claims, 6 Drawing Figures

SYSTEM FOR TESTING VIDEO EQUIPMENT

BACKGROUND OF THE INVENTION

1. Technical Field

This invention relates generally to testing apparatus for video equipment and more particularly to a video test system utilizable by both consumers and technicians for generating test signals and patterns.

2. Background Art

Lower mass production costs and standardization of recording formats have greatly increased the popularity of video cassette recorders and players in the United States. Production of video recorder units in the popular VHS format exceeded 100 million units in 1986 and has been projected to exceed 150 million units by 1988. Sales of blank VHS video tape cassettes in 1985 exceeded 231 million units. What was once considered an extravagance has become common place. Not only have home video recorders been utilized for recording televised broadcasts for subsequent replay at a more convenient time but, in recent years, the popularity of utilizing video recorders and low cost video players for playback of prerecorded movies has risen phenominally. Movie studios have found unexpected benefits in releasing old films in video cassette format and video rental shops have blossomed as an industry virtually unknown five years ago.

Sources of errors have been inherent in video tape recorders and players. Errors were introduced due to head misalignment, recording or playback speed fluctuations, cables and connections and audio systems In addition, errors such as color misalignment and convergence were inherent in television receivers and monitors. Through the use of video recorders incorporate their own tuners, additional sources of errors have been introduced into the video systems. Not only was adjustment of the tuner of a television receiver required but, in addition, the video recorder tuner required precise adjustment.

Playback and recording heads eventually suffer misalignment and wear. Such wear and misalignment occured in gradual stages and was often unnoticed. Further, television receivers themselves were often misaligned due to aging and possible assembly or technician errors. Often, video recorders were employed for recording without a user first checking to determine that the tracking and other user adjustments were properly set. As a result, recordings were misaligned and suffered signal degradation.

Heretofore, adjustments for color conversion and alignment in video receivers, i.e. television sets, video monitors and video recorders and/or players required complex equipment such as signal generators including test pattern generators. Naturally, such equipment was only within the realm of persons having technical expertise and, as such, a consumer was generally not aware of adjustments which were necessary in a video system unless the system was otherwise defective, in need of service, and sent to a technician who would perform adjustments as part of other service procedures.

SUMMARY OF THE INVENTION

Video systems are diagnosed to determine alignment, convergence, audio and other deficiencies and corrective adjustments performed by employing a video cassette or video tape player or recorder coupled to a monitor or television receiver. A video cassette tape carries prerecorded test signals and patterns such as color bar patterns, dot patterns and crosshatch patterns. In addition, the tape may carry prerecorded audio test signals on two audio channels.

The test signals are preferably prerecorded on a leader portion of a video tape utilizing test pattern signal generators prior to loading each tape into a cassette. The balance of the cassette as well as the prerecorded leader may be subsequently utilized for recording video and audio signals. The various test signals are recorded at different speeds for testing playback speeds of the video recorder or player.

From the foregoing compendium, it will be appreciated that it is an aspect of the invention to provide a system for testing video equipment of the general character described which is not, however, subject to the disadvantages of the background art aforementioned.

It is a further aspect of the present invention to provide a system for testing video equipment of the general character described which is low in cost and simple in usage.

A feature of the present invention is to provide a system for testing video equipment of the general character described which is well suited for use by persons without technical expertise and which is adapted to assist such persons in determining whether video equipment in need of adjustment.

A consideration of the present invention is to provide a system for testing video equipment of the general character described which facilitates technical adjustments of video equipment without the necessity of obtaining separate signal generating equipment.

Yet another aspect of the present invention is to provide a system for testing video equipment of the general character described which permits a rapid determination of the necessity for adjustments on a video recorder prior to commencing a video recording procedure.

Other aspects, features and considerations of the system for testing video equipment in part will be obvious and in part will be pointed out hereinafter.

With these ends in view, the invention finds embodiment in certain combinations of elements an arrangements of parts and series of steps by which the said considerations, aspects and features and certain other considerations, aspects and features are hereinafter attained, all as fully described with reference the accompanying drawings in a scope which is more particularly pointed out and indicated in the appended claims.

BRIEF DESCRIPTION OF THE DRAWING

In the accompanying drawings in which is shown one of the various possible exemplary embodiments of the invention.

DESCRIPTION OF THE PREFERRED EMBODIMENT

Figure 1:
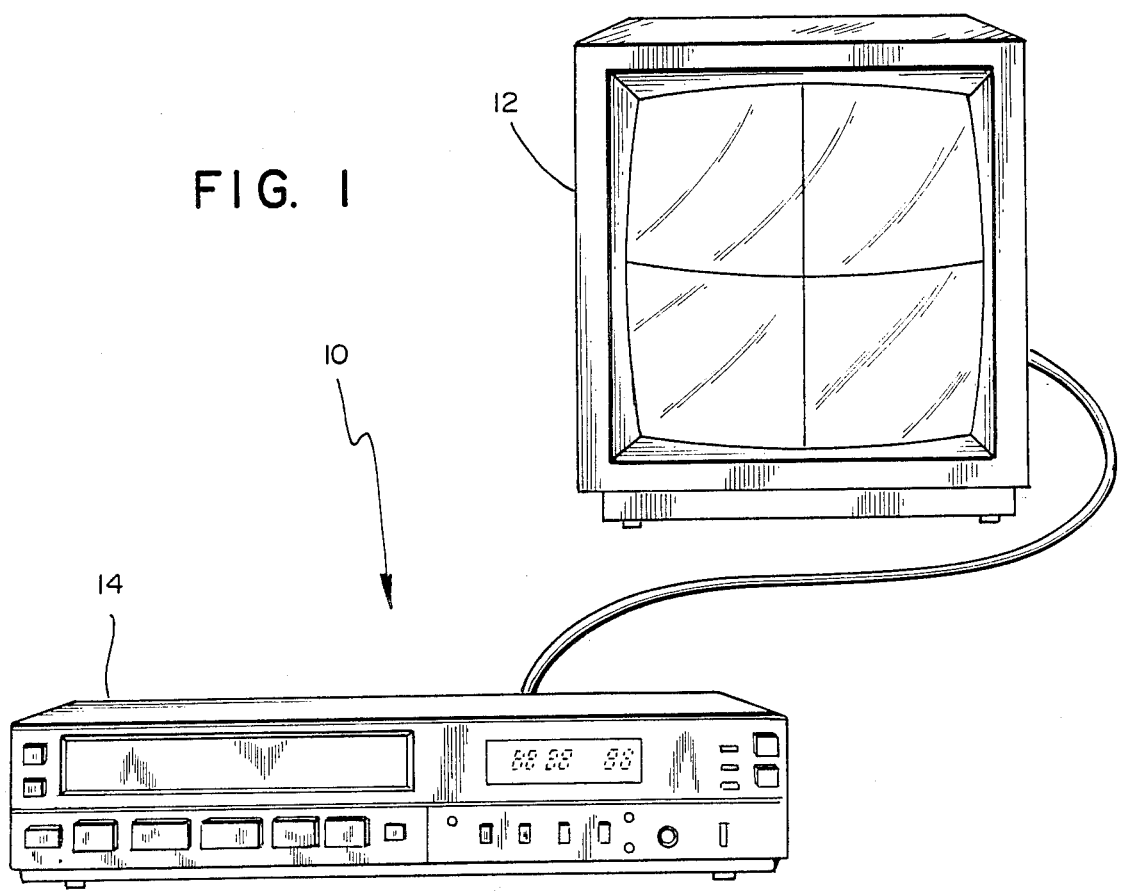
FIG. 1 is a perspective illustration of an interconnected video cassette recorder and television receiver employing the testing procedure in accordance with the invention and utilizing a prerecorded video cassette carrying test signals and showing a typicaly crosshatch pattern being played back for providing adjustments.
Figure 2:
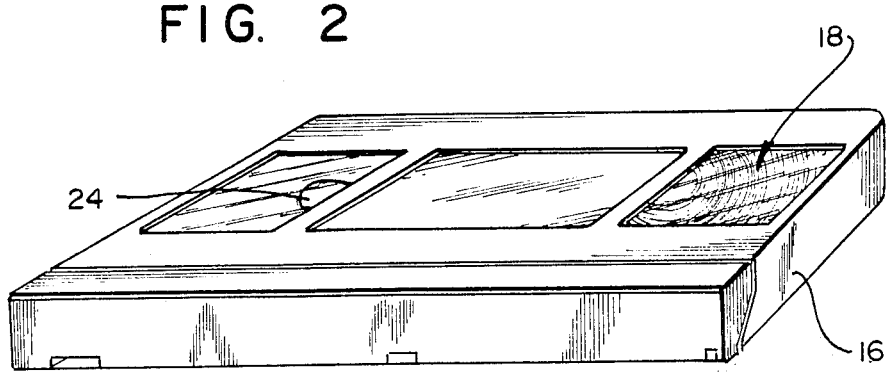
FIG. 2 is a perspective illustration of a typical video cassette carrying a tape having a prerecorded test leader in accordance with the present invention and with the remainder of the tape being blank and suitable for recording of video and audio signals.

The present invention provides a system suitable for both the lay person and the technician for video system diagnosis, i.e., determining whether various adjustments are necessary; in addition, the system is suitable for rendering adjustments found to be necessary. Heretofore, sophisticated and relatively expensive test equipment was required in order to generate appropriate visual test pattern signals for determining whether video system adjustments were required and for making the proper adJustments. Pursuant to the present invention, however, a video tape player or recorder and a receiver or monitor, either or both of which may constitute the equipment to be tested and adjusted, and a prerecorded video tape cassette constructed in accordance with the invention are all that is necessary.

Referring now in detail to the drawings, the reference numeral 10 denotes generally an operating video system generating a typical video test pattern in accordance with the present invention. The video system 10 includes a television receiver 12 operably interfaced to a video tape cassette recorder 14 operating in a playback mode.

The term video tape cassette recorder as hereinafter employed should be construed to encompass all forms of video tape recorders (VTRs), video cassette recorders (VCRs) and video tape players and all formats of tape.

The video cassette recorder 14 carries a video cassette 16 having a prerecorded video tape 18. In accordance with the invention, prerecorded on at least an initial length of the video tape 18 is a series of video test signals including NTSC standard test patterns and, in addition, a visual countdown. Also various audio test signals are carried.

Figure 3:
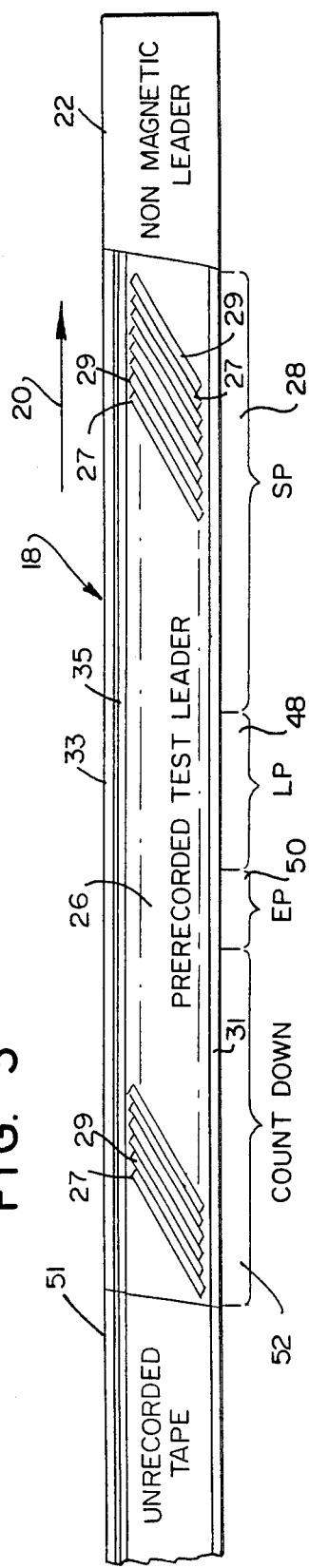
FIG. 3 is a schemetized diagram of an initial length of the tape carried in the cassette illustrated in FIG. 2 with the path of travel in the playback or record mode extending from left to right.

When viewing FIG. 3, wherein the initial prerecorded tape portion is illustrated, it should be understood that the path of tape travel during playback is indicated by a heavy arrow 20. Initially, a non-magnetic leader 22 may extend between the forward end of the tape 18 and a cassette take-up spool 24. Thereafter, a specified length of tape, hereafter designated as a test leader 26, is reserved for and carries video test signals and patterns recorded on pairs of video tracks 27, 29. The leader 26 also carries a control track 31.

Optionally, various audio test signals are recorded on a pair of conventional audio tracks 33, 35. For equipment having helical scan audio heads, compatible multiplex recorded audio signals are carried in or behind the video tracks 27, 29.

Figure 5A:
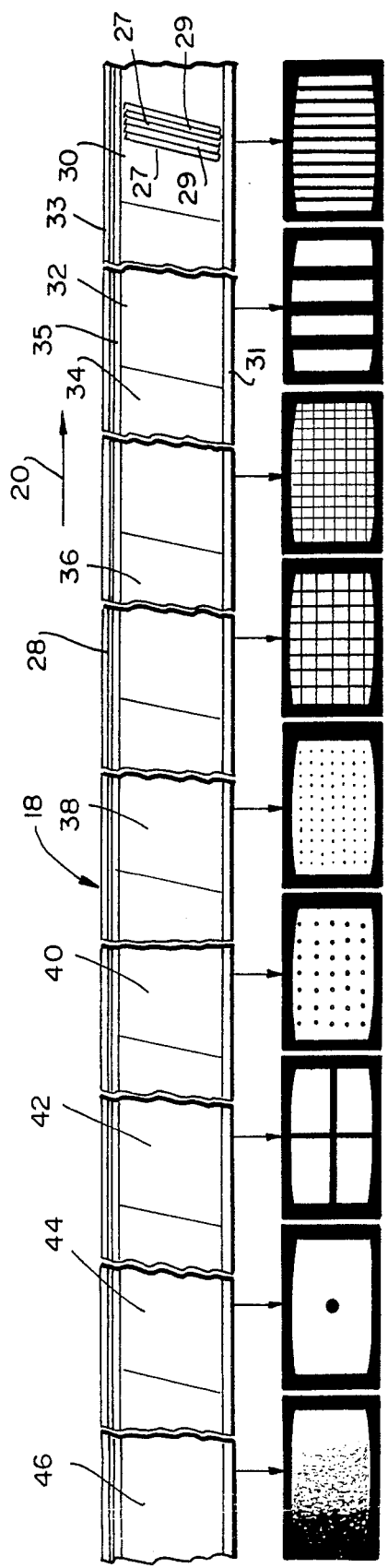
FIG. 5A is a schemetized representation of various prerecorded segments of the video cassette tape and illustrating a corresponding visual test pattern which is transduced from each of the segments.

A portion of the test leader 26, for example an initial portion 28, carries a plurality of prerecorded test signals and patterns which are recorded at the fast recording speed designated "SP" for highest resolution. With reference now to FIG. 5A wherein the portion 28 is depicted in enlarged scale along with corresponding transduced visual images, it will be seen that the portion 28 may comprise a plurality of discrete recorded segments 30, 32, 34, 36, 38, 40, 42, 44, 46, and so on.

The segment 30 itself may carry, for example, color test signal patterns such as NTSC color bars. Depicted as the corresponding visual transduced image in FIG. 5A is a ten bar gated rainbow pattern. A ten bar gated rainbow comprises ten color bars raised on a luminance pedestal and gated at 30° intervals from burst. Such pattern is used for testing and aligning color circuitry. With respect to the segment 32, a three bar gated rainbow pattern is recorded. The three bar gated pattern is derived from the rainbow pattern and is gated at 90°, 180° and 270° to rapidly expedite color alignment procedures. Additional color patterns which may be prerecorded include an ungated rainbow which comprises a progressive scan through the color spectrum from the color burst. The ungated rainbow is shown as being prerecorded in the segment 46.

The color test patterns produced as a result of the playback of these segments are useful in determining whether or not various adjustments are necessary in the color circuitry of a television receiver, some of which may be accomplished with user accesible controls. Further, initial playback of virtually any test pattern will alert a user to any tracking adjustments which may be necessary on the video cassette recorder 14 or player.

Depicted as being recorded in the segment 34 is a crosshatch test pattern which is useful for checking size, overscan and pin cushion distortion. A larger crosshatch test pattern, depicted as being prerecorded in the segment 36, is useful in testing and adjusting for dynamic convergance and linearity.

Dot test patterns, depicted as being prerecorded in the segments 38 and 40 of the tape portion 28, are useful in testing and adjusting for dynamic convergence while a single center dot test pattern, which is depicted as being prerecorded in the segment 44, is useful for adjusting for static convergence and defines the center of the screen. In addition, a single crosshair, depicted as being prerecorded in segment 42, provides a screen center and is useful for adjusting convergence and position.

In accordance with the invention all or some of the prerecorded test pattern signals which are prerecorded in the initial portion 28 of the test leader 26 are repeated at a slower recording speed, for example, "LP" in a further portion 48 and again repeated at the slowest recording speed, "EP" in another portion 50. The purpose of recording test patterns at different speeds is to perform video recorder playback speed test checks. Optimum test pattern signal quality for adjustments and the like is rendered at the fastest playing speed which may be found in the initial portion 28. Accordingly, the longest duration playback and the most patterns are found in the portion 28.

Figure 5B:
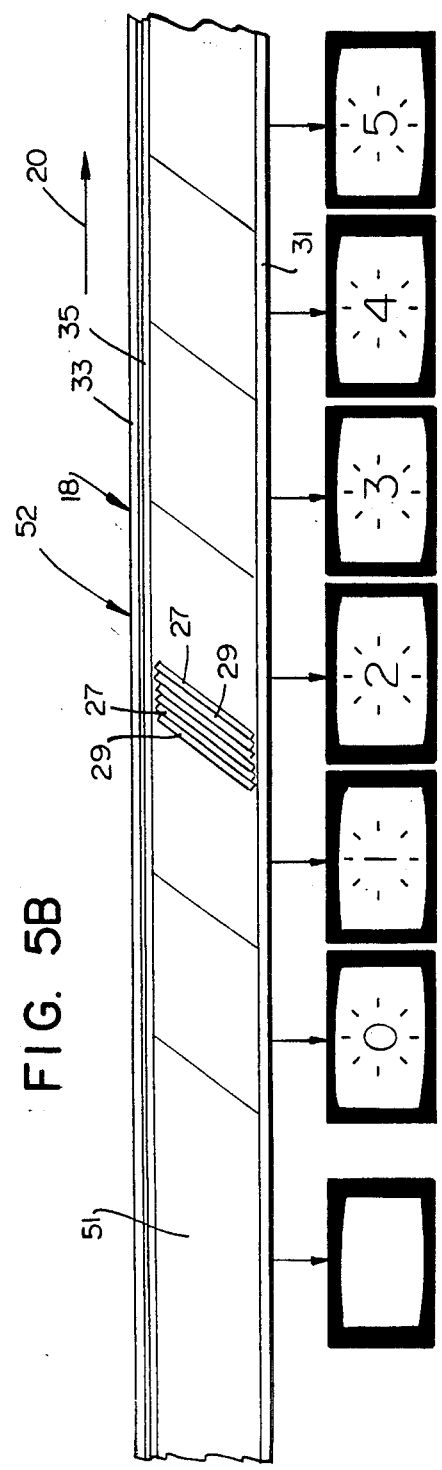
FIG. 5B in a schematized representation of tape segments comprising a continuation of the prerecorded segments illutrated in FIG. 5A and showing, a corresponding visual countdown transduced from each segment.

In addition to the visual test signals and patterns, the present invention also provides for synchronization of material to be subsequently recorded in a remaining blank portion 51 of the tape 18. This is accomplished by including a short duration numerical count down recorded on a final portion 52 of the test leader 26. The final portion 52, comprises a series of tape segments depicted in FIG. 5B along with their corresponding visual signals. Each numeral is displayed for a short duration, e.g. one second or less, and is helpful for initializing when recording or dubbing on the blank portion 51 of the video tape 18.

As previously mentioned, along with the visual signals, the prerecorded test leader may include audio signals for verifying and adjusting the accompanying audio components of the video system 10. For example, speaker performance and amplifier performance may be checked.

It should also be appreciated that the present invention should not be considered as limited to VHS format systems and is readily adaptable to any video tape system, ranging from professional studio recording formats including reel to reel and U-matic through VHS and Beta on 12.56 width (0.50 inch) tape through 8 mm format video tapes. In addition, for technician usage in rendering the necessary adjustments, an entire video tape may comprise only prerecorded test pattern signals and audio test signals. This serves to provide longer duration test patterns, thus affording a technician ample time to make adjustments without having to replay any of the particular test pattern segments.

Figure 4:
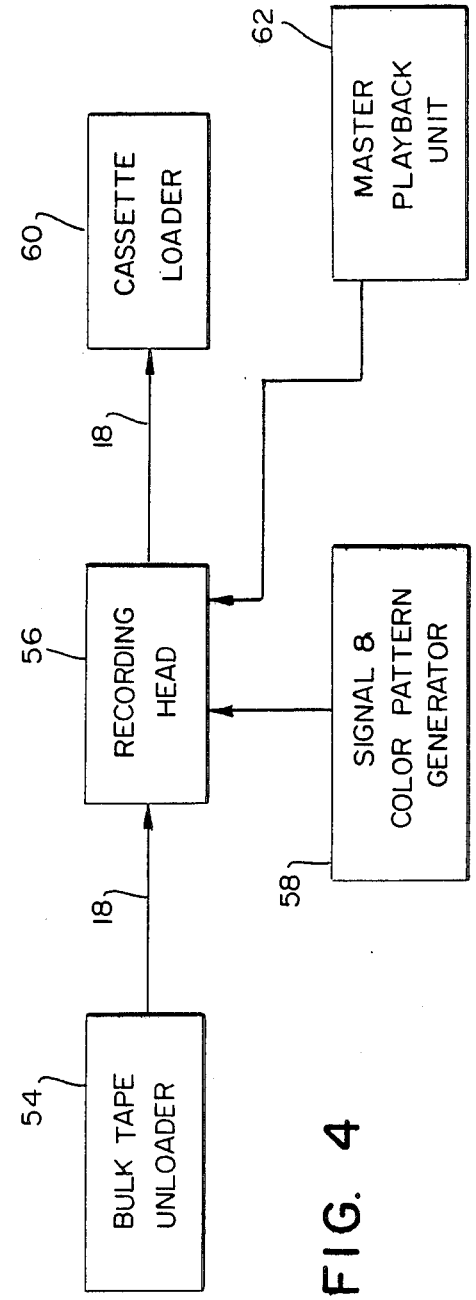
FIG. 4 is a schemetized diagram illustrating a typical apparatus for producing video cassettes having prerecorded test signals and patterns in accordance with the invention.

Referring now to FIG. 4 wherein a typical apparatus for producing video tapes 18 in accordance with the invention is illustrated, it will be seen that a bulk tape unloader designated generally by the reference numeral 54 is employed to carry bulk tape and unwind predetermined lengths The bulk tape unloader can be any of a number of commercially available units. The video tape 18 extends from the tape unloader 54 through a video recording head 56. As previously mentioned, in addition to video signals, audio test signals may be prerecorded on the tape 18 and thus, the recording head 56 may include a suitable audio recording heads. The recording head 56 can comprise a conventional high speed video/audio duplicating apparatus.

The recording head 56 receives various video test signals and color patterns which are generated at a signal and color pattern generator 58. The signal and color pattern generator can be any of a number of commercially available units commonly employed for the purpose of generating such signals. Automatic controls are provide to sequentially vary the signals in correspondence with a predetermined pattern for recording on the leader 28 of each tape length 18 which is thereafter wound upon a cassette at a cassette loader 60. Appropriate controls are provided at the recording head for recording at the appropriate speed. In addition, the visual countdown, prerecorded on a master tape is played back on a playback unit 62. The output of the playback unit 62 is fed to the recording head 56 for recording.

As soon as the test leader portion 26 of the length of tape 18 has been recorded, the cassette loader transfers to high speed operation for loading the balance of each cassette.

The recording and loading apparatus may be employed with the signal and pattern generator 58 to provide test signals and patterns of high quality and accuracy for each of the tapes or may be employed to generate a master tape from which each production tape is recorded by utilizing the master playback unit 62.

Additionally, the system of the present invention will find employment with other prerecorded video mediums. For example, test patterns and signals may be recorded on video discs and video disc players utilized for generating the appropriate video test signals and patterns.

Further, the system of the present invention may be utilized to diagnose and test audio apparatus by utlizing prerecorded audio outputs, for example, the outputs of a tone generator, for testing audio equipment. The system may employ such prerecorded audio test signals on a conventional video cassette, if the equipment to be tested comprises a portion of a video system or on a conventional audio cassette tape for testing audio playback and sound generation equipment.

Thus it will be seen that there is provided a system for testing video equipment which acheives the various features, aspects, considerations of the present invention and which is well suited to meet the conditions of practical usage.

As various changes might be made in the invention as above set forth, it is to be understood that all matter herein described or shown in the accompanying drawings be interpreted as illustriative and not in limiting sense.

Having thus described the invention there as claimed and new and desired to be secured by Letters Patent:

1. A mass produced article of manufacture comprising a recording medium for the public for the recording of video signals such as televised broadcasts, including:
   a first portion of said recording medium comprising a blank information section thereof, which blank information section includes substantially most of the recording medium for recording said video signals; and a second portion of said recording medium having a prerecorded section, said prerecorded section preceding said blank information section as a leader thereof and containing information necessary to determine if repair of adjustment of a video signal receiving device and/or a video signal recording device for recording said blank information section of said recording medium is necessary.

2. The mass produced article of claim 1, wherein said recording medium includes a video tape carried within a cassette housing.

3. The mass produced article of claim 1, wherein said prerecorded section contains information which includes a video color test pattern.

4. The mass produced article of claim 1, wherein said prerecorded section contains play back information for determining if tape speed adjustment is necessary or repair is necessary.

5. The mass produced article of claim 1, wherein said prerecorded section contains information which includes a visual sequential numerical countdown.

6. A low cost mass produced system for consumer diagnosis of necessary video equipment adjustments, the video equipment including a video cassette recorder and a television receiver or monitor, the system including a wound blank video tape in a cassette, the wound video tape having a length of magnetic leader, the magnetic leader including prerecorded video test signals whereby the video equipment will display the test signals to permit the consumer to determine whether adjustment or repair is necessary prior to recording on the blank portion of the video tape cassette following the magnetic leader.

7. A low cost mass produced system for consumer diagnosis of necessary video equipment adjustments in accordance with claim 6 wherein the leader includes a plurality of video test signals prerecorded thereon whereby various diagnostic checks of the video equipment may be performed prior to recording.

8. A low cost mass produced system for consumer diagnosis of necessary video equipment adjustements in accordance with claim 7 wherein at least one of the video test signals comprises a signal corresponding to a video color test pattern whereby color adjustments of the video equipment may be performed prior to recording.

9. A low cast mass produced system for consumer diagnosis of necessary video equipment adjustments as constructed in accordance with claim 7 wherein at least one of the video signals is recorded at different play back speed than the other whereby the need for play back speed adjustment of the video equipment may be automatically determined.

10. A low cost mass produced system for consumer diagnosis of necessary video equipment adjustments as constructed in accordance with claim 7 wherein the signals include a visual sequential numeral countdown whereby commencement of consumer recording on the video tape cassette may be sequenced.

11. A low cost mass produced system for consumer diagnosis of necessary video equipment adjustments as constructed in accordance with claim 10 wherein the countdown is prerecorded adjacent the leader end.

12. A low cost mass produced system for consumer diagnosis of necessary video equipment adjustments as constructed in accordance with claim 6 including a consumer recording on the previously blank portion of the video tape, and the video tape being rewound, the system for consumer diagnosis of necessary video equipment adjustments comprising the rewound recorded video tape cassette for video equipment diagnosis and adjustement prior to play back of the consumer recording.

13. A method of consumer video recording, the method comprising the steps of:
 (a) interconnecting a video recorder means with a receiver/monitor means;
 (b) loading the video recorder means with a mass produced video tape carrying prerecorded test signals only on a leader portion thereof;
 (c) operating the video recorder means to play back the prerecorded test signals;
 (d) performing any necessary equipment adjustment while observing the test signals; and
 (e) recording on the video tape following the leader portion.

14. A method of consumer recording constructed in accordance with claim 13 wherein the video tape includes prerecorded audio test signals.

* * * * *